United States Patent
Ito

(10) Patent No.: US 10,232,670 B2
(45) Date of Patent: Mar. 19, 2019

(54) PNEUMATIC TIRE

(71) Applicant: SUMITOMO RUBBER INDUSTRIES, LTD., Kobe-shi, Hyogo (JP)

(72) Inventor: Tadashi Ito, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 708 days.

(21) Appl. No.: 14/954,102

(22) Filed: Nov. 30, 2015

(65) Prior Publication Data

US 2016/0167442 A1 Jun. 16, 2016

(30) Foreign Application Priority Data

Dec. 12, 2014 (JP) .................................. 2014-252350

(51) Int. Cl.
| | | |
|---|---|---|
| B60C 11/11 | (2006.01) | |
| B60C 11/12 | (2006.01) | |
| B60C 11/03 | (2006.01) | |

(52) U.S. Cl.
CPC ...... *B60C 11/1259* (2013.01); *B60C 11/0306* (2013.01); *B60C 11/11* (2013.01); *B60C 11/12* (2013.01); *B60C 2011/0334* (2013.01); *B60C 2011/0346* (2013.01); *B60C 2011/0365* (2013.01); *B60C 2011/1209* (2013.01); *B60C 2011/129* (2013.01); *B60C 2011/1268* (2013.01); *B60C 2200/06* (2013.01)

(58) Field of Classification Search
CPC ..... B60C 11/11; B60C 11/0306; B60C 11/12; B60C 2011/0334; B60C 2011/0365; B60C 2011/1209; B60C 2011/1268; B60C 2011/129

See application file for complete search history.

(56) References Cited

U.S. PATENT DOCUMENTS

| | | | | |
|---|---|---|---|---|
| 2,186,180 A | * | 1/1940 | Sloman | ............... B60C 11/0309 |
| | | | | 152/209.2 |
| 2013/0087260 A1 | * | 4/2013 | Tobino | .................... B60C 11/11 |
| | | | | 152/209.8 |

FOREIGN PATENT DOCUMENTS

| | | |
|---|---|---|
| EP | 1 002 666 A2 | 5/2000 |
| EP | 2 578 419 A1 | 4/2013 |
| EP | 2 808 179 A1 | 12/2014 |
| JP | 02-212204 A * | 8/1990 |
| JP | 2006-111091 A * | 4/2006 |
| JP | 2009-035130 A * | 2/2009 |

(Continued)

OTHER PUBLICATIONS

Machine translation for Japan 2009-035130 (Year: 2018).*

(Continued)

*Primary Examiner* — Steven D Maki

(74) *Attorney, Agent, or Firm* — Birch, Stewart, Kolasch & Birch, LLP

(57) ABSTRACT

A pneumatic tire 1 is provided in the tread portion 2 with blocks each provided with sipes 9 extending across the entire axial width of the block. The blocks include axially innermost first blocks 3 each having a longitudinal block rigidity (G), and axially outer blocks 4 each having a longitudinal block rigidity (G). The longitudinal block rigidity (G) of the axially innermost first blocks 3 is 90% to 110% of the longitudinal block rigidity (G) of the axially outer blocks 4.

20 Claims, 5 Drawing Sheets

(56) References Cited

FOREIGN PATENT DOCUMENTS

JP      2009-190558 A     8/2009
KR    10-2012-0087823 A   8/2012

OTHER PUBLICATIONS

Machine translation for Japan 2006-111091 (Year: 2018).*
Machine translation for Japan 02-212204 (Year: 2018).*
Extended European Search Report dated May 12, 2016, in European Patent Application No. 15197860.8.

* cited by examiner

PNEUMATIC TIRE

BACKGROUND OF THE INVENTION

The present invention relates to a pneumatic tire, more particularly to a tread pattern capable of improving wear resistance performance, while maintaining on-icy-road performance at high level.

In order to improve on-icy-road performance of a pneumatic tire, a technique to provide sipes for each block in the tread portion has been widely employed, therefore, by the scratching effect of the edges of the sipes, the frictional force of the tire on icy roads is increased.

In such a pneumatic tire, however, there is a tendency that the rigidity of the siped block becomes low, and the wear resistance performance of the tire is deteriorated. This is particularly true in a heavy duty pneumatic tire.

SUMMARY OF THE INVENTION

It is therefore, an object of the present invention to provide a pneumatic tire which is improved in the wear resistance performance, while maintaining on-icy-road performance at high level.

According to the present invention, a pneumatic tire is provided in a tread portion with a plurality of blocks each provided with sipes extending across the entire axial width of the block, the blocks include axially innermost first blocks each having a longitudinal block rigidity (G), and axially outer blocks each having a longitudinal block rigidity (G), and the longitudinal block rigidity (G) of the axially innermost first blocks is 90% to 110% of the longitudinal block rigidity (G) of the axially outer blocks, wherein the longitudinal block rigidity (G) of a block is defined by the following equation: $G=(A \times B)/(C \times D \times E)$, wherein A is the maximum length in the tire circumferential direction of the block, B is the maximum width in the tire axial direction of the block, C is the maximum groove depth of lateral grooves which are disposed on both sides of the block in the tire circumferential direction so as to circumferentially divide the block, D is the maximum depth of the sipes disposed in the block, and E is the number of the sipes disposed in the block.

Further, the pneumatic tire according to the present invention may have the following features (1)-(9):

(1) the axially outer blocks include second blocks adjacent to the axially innermost first blocks, and the maximum width in the tire axial direction of the axially innermost first blocks is less than the maximum width in the tire axial direction of the second blocks;

(2) the lateral grooves include first lateral grooves between the axially innermost first blocks, and second lateral grooves between the second blocks, and the groove width of the first lateral grooves is less than the groove width of the second lateral grooves;

(3) the axially outer blocks include third blocks disposed axially outside the second blocks adjacently thereto, and the maximum width in the tire axial direction of the second blocks is less than the maximum width in the tire axial direction of the third blocks;

(4) the lateral grooves include third lateral grooves between the third blocks, and the groove width of the second lateral grooves is less than the groove width of the third lateral grooves;

(5) the depth of the sipes of the third blocks is more than the depth of the sipes of the axially innermost first blocks and more than the depth of the sipes of the second blocks;

(6) the axially outer blocks include fourth blocks disposed between the third blocks and the tread edge, the summation of the edge lengths of the sipes disposed in all of the axially innermost first blocks and second blocks is 30000 to 40000 mm, and the summation of the edge lengths of the sipes disposed in all of the third blocks and fourth blocks is 30000 to 40000 mm;

(7) each of the blocks is subdivided in the tire circumferential direction by a plurality of sipes into small block pieces and large block pieces which are alternately arranged in the tire circumferential direction, the small block pieces have a smaller width L1 in the tire circumferential direction, and the large block pieces having a larger width L2 in the tire circumferential direction than the width of the small block pieces;

(8) the ratio L2/L1 of the width L2 in the tire circumferential direction of the large block pieces to the width L1 in the tire circumferential direction of the small block pieces is 3.0 to 5.0;

(9) each of the blocks includes 3 or more small block pieces.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

The tread edges Te are the axial outermost edges of the ground contacting patch which occurs under the normally inflated loaded condition when the camber angle of the tire is zero.

The tread width TW is the width measured under the normally inflated unloaded condition, as the axial distance between the tread edges Te determined as above.

The term "sipe" means a very narrow groove having a groove width of less than 1 mm or a cut having no substantial width.

DESCRIPTION OF THE PREFERRED EMBODIMENTS

Figure 1:
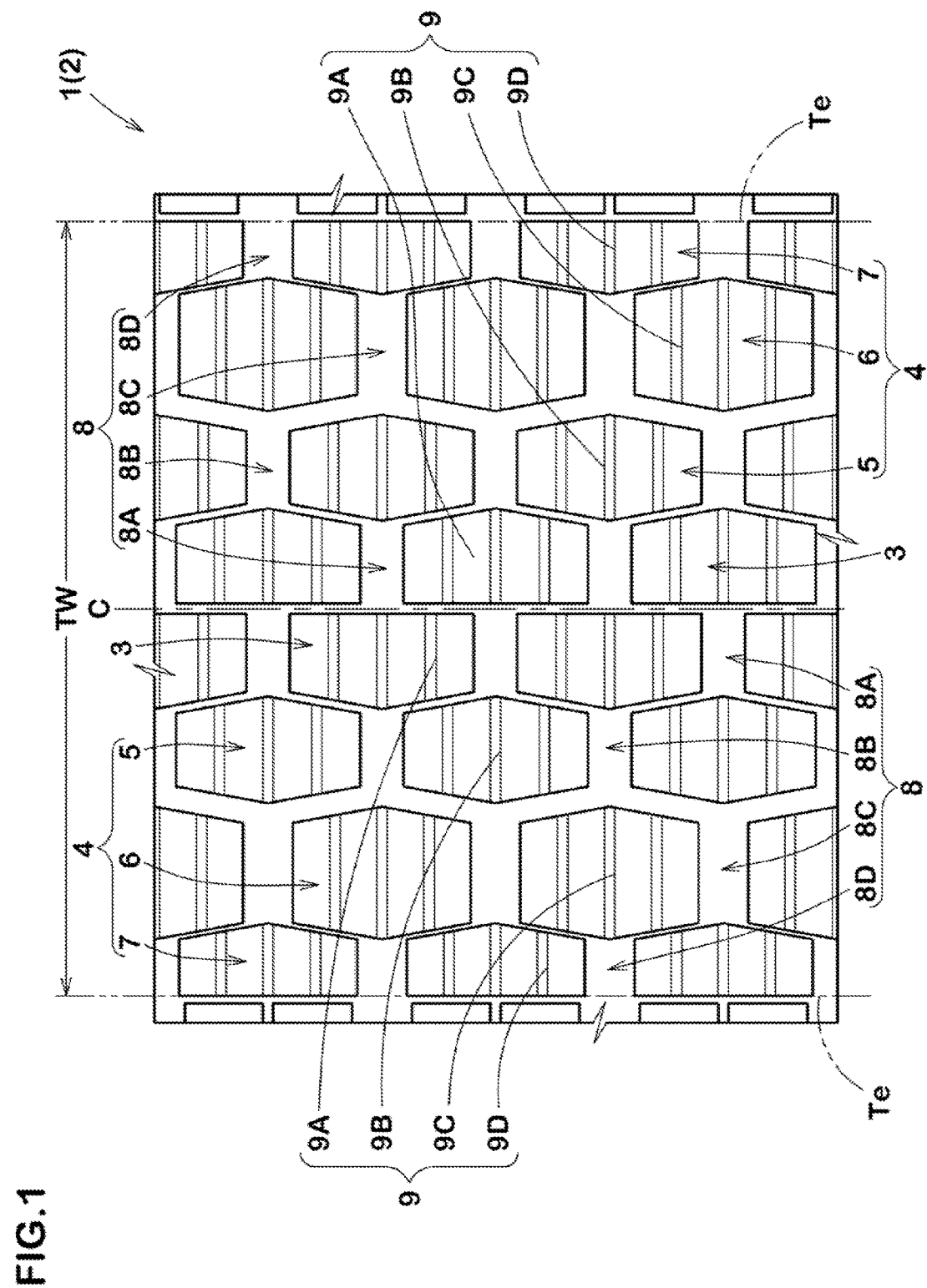
FIG. 1 is a developed partial view of the tread portion of a pneumatic tire an embodiment of the present invention.

An embodiment of the present invention will now be described in detail in conjunction with the accompanying drawings.

The present invention is suitably applied to a heavy duty pneumatic tire for winter use.

As well known in the art, a pneumatic tire comprises a tread portion 2 whose outer surface defines the tread, a pair of axially spaced bead portions mounted on bead seats of a rim, a pair of sidewall portions extending between the tread edges and the bead portions, a carcass extending between the bead portions through the tread portion and the sidewall portions, and a tread reinforcing cord layer disposed radially outside the carcass in the tread portion.

In the drawings, a pneumatic tire 1 as an embodiment of the present invention is designed as a heavy duty pneumatic tire for winter use.

The pneumatic tire 1 is provided in the tread portion 2 with axially innermost first blocks 3 and axially outer blocks 4.

The axially outer blocks 4 are disposed between the axially innermost first blocks 3 and each of the tread edges Te.

In this embodiment, the axially innermost first blocks 3 are disposed on each side of the tire equator C. The axially innermost first blocks 3 are arranged in two circumferential rows. The axially outer blocks 4 are arranged in three circumferential rows on each side of the tire equator C. The three circumferential rows are a row of second blocks 5 adjacent to the axially innermost first blocks 3, a row of fourth blocks 7 adjacent to the tread edge Te, and a row of third blocks 6 between the row of the second blocks 5 and the row of the fourth blocks 7.

On both sides in the tire circumferential direction of each of the blocks 3 and 4, two lateral grooves 8 are disposed so as to circumferentially divide the block. In this embodiment, accordingly, the lateral grooves 8 are first lateral grooves 8A between the axially innermost first blocks 3, second lateral grooves 8B between the second blocks 5, third lateral grooves 8C between the third blocks 6, and fourth lateral grooves 8D between the fourth blocks 7.

Each of the blocks 3 and 4 is provided with sipes 9 extending across the entire axial width of the block to have both ends opened. In this embodiment, accordingly, the sipes 9 are first sipes 9A disposed in each of the axially innermost first blocks 3, second sipes 9B disposed in each of the second blocks 5, third sipes 9C disposed in each of the third blocks 6, and fourth sipes 9D disposed in each of the axially outermost fourth blocks 7.

Given that a longitudinal block rigidity (G) of a block (3, 4) is defined by the following equation (1)

$$G=(A \times B)/(C \times D \times E) \quad (1)$$

wherein

A is the maximum length in the tire circumferential direction of the block.

B is the maximum width in the tire axial direction of the block,

C is the maximum groove depth of the lateral grooves 8 disposed on both sides of the block in the tire circumferential direction to circumferential divide the block, D is the maximum depth of the sipes disposed in the block, and E is the number of the sipes disposed in the block, the longitudinal block rigidity (G) of the axially innermost first blocks 3 is set in a range of from 90% to 110% of the longitudinal block rigidity (G) of the axially outer blocks 4.

As to the number of the sipes, it is preferable that sipes having closed ends are not counted.

Wear energy that a tire rolling on a road surface is subjected to is largely related to (almost proportional to) a product of the amount of slippage between the tire and the road surface and the ground pressure of the tire. Generally, during straight running, the ground pressure has more influence on the wear energy than the amount of slippage. In contrast, during cornering, the amount of slippage (lateral force) has more influence on the wear energy than the ground pressure.

In a general vehicle which serves for straight running and cornering, therefore, it is desirable to reduce the wear difference between a rigidity of each block in the tire axial direction and a rigidity of the block in the tire circumferential direction in order to reduce the difference between wear of the block in the tire axial direction and wear of the block in the tire circumferential direction.

In the present invention, the longitudinal block rigidity defined by the equation (1) which can be easily calculated is employed as the above-mentioned rigidities of each block in both directions. By setting the longitudinal block rigidity (G) of the axially innermost first blocks 3 within a range of from 90% to 110% of the longitudinal block rigidity (G) of the axially outer blocks 4, it is possible to reduce the difference between the rigidities of the blocks 3, 4. As a result, the blocks 3 and 4 are worn evenly under usual combination running of straight running and cornering. Therefore, the tire 1 according to the present invention can be improved in the wear resistance performance, while maintaining on-icy-road performance at high level.

Next, preferable configurations of the blocks 3 and 4 will now be described in detail.

Figure 2:
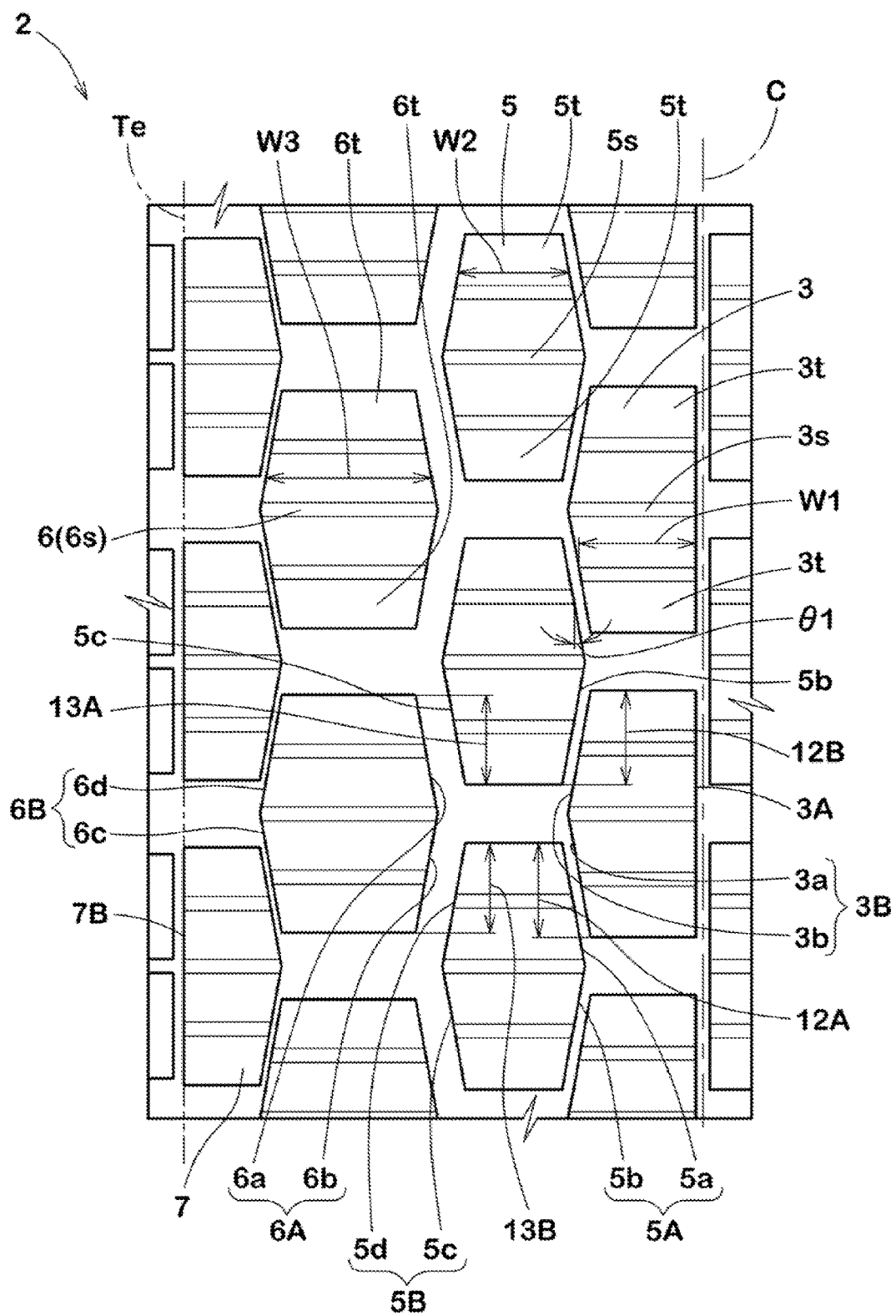
FIGS. 2, 3, 4 and 5 are a closeup of a left side part of the tread portion of FIG. 1.

As shown in FIG. 2, the tread of each of the axially innermost first blocks 3 has a pentagonal shape. The width W1 in the tire axial direction of the axially innermost first block 3 is gradually decreased from its central portion 3s toward its each end 3t in the tire circumferential direction. In such axially innermost first block 3, the ends 3t can be appropriately deformed when the axially innermost first block 3 steps on the ground and kicks back against the ground. As a result, the slippage of the axially innermost first block 3 on the road surface is reduced. Thereby, the wear energy that the axially innermost first block 3 is subjected to is decreased, and the wear resistance performance can be improved.

The axially innermost first block 3 has an inside block edge 3A extending in the tire circumferential direction on its tire equator C side, and an outside block edge 3B extending in the tire circumferential direction on its outside in the tire axial direction.

The axially outside block edge 3B comprises a first oblique part 3a inclined with respect to the tire circumferential direction to one tire axial direction, and a second oblique part 3b inclined with respect to the tire circumferential direction to the other tire axial direction.

The inside block edge 3A is straight and parallel with the tire circumferential direction. Such inside block edge 3A does not reduce the rigidity in the tire circumferential direction of an adjacent portion of the axially innermost first block 3 which portion is subjected to the highest ground pressure, therefore, wear occurring in the adjacent portion to the edge 3A during straight running can be reduced.

The tread of each of the second blocks 5 has a hexagonal shape. The width W2 in the tire axial direction of the second block 5 is gradually decreased from its central portion 5s toward its each end 5t in the tire circumferential direction. In such second block 5, the ends 5t suppress the slippage of the block 5 on the road surface, and the wear resistance performance is improved.

The second block 5 has an inside block edge 5A extending in the tire circumferential direction on its tire equator C side, and an outside block edge 5B extending in the tire circumferential direction on its outside in the tire axial direction.

The axially inside block edge 5A comprises a first oblique part 5a inclined with respect to the tire circumferential direction to one tire axial direction, and a second oblique part 5b inclined with respect to the tire circumferential direction to the other tire axial direction.

The axially outside block edge 5B comprises a third oblique part 5c inclined with respect to the tire circumferential direction to one tire axial direction, and a fourth oblique part 5d inclined with respect to the tire circumferential direction to the other tire axial direction.

Since the second block 5 does not have block edges parallel with the tire circumferential direction, such second block 5 becomes smaller in the rigidity in the tire axial direction in comparison with the axially innermost first block 3. However, since the central portion 5s bulges toward both sides in the tire axial direction, the second block 5 has an axial edge component larger than that of the axially innermost first block 3. Therefore, the second block 5, which is subjected to lower ground pressure and larger lateral force than the axially innermost first blocks 3, has preferable rigidity, and the wear of the second block becomes close to the wear of the axially innermost first block 3.

The first oblique part 5a of the inside block edge 5A of each of the second blocks 5 overlaps in the tire circumferential direction with the first oblique part 3a of the axially outside block edge 3B of one of the axially innermost first blocks 3 to form an overlap 12A.

The second oblique part 5b of the inside block edge 5A of each of the second blocks 5 overlaps in the tire circumferential direction with the second oblique part 3b of the axially outside block edge 3B of one of the axially innermost first blocks 3 to form an overlap 12B.

If the axially innermost first blocks 3 and/or the second blocks 5 are subjected to large force in the tire circumferential direction or axial direction which can largely deform the blocks 3, 5, the blocks 3, 5 can support each other in the overlaps 12A and 12B, therefore, the deformation of the blocks 3, 5 is suppressed to reduce the slippage on the road surface, and the wear resistance performance can be improved.

It is preferable that the maximum width B2 in the tire axial direction of the second block 5 is more than the maximum width in the tire axial direction B1 of the axially innermost first block 3.

The second block 5 is subjected to a larger lateral force than that of the axially innermost first block 3, therefore, by setting the rigidity in the tire axial direction of the second block 5 as being higher than the rigidity in the tire axial direction of the axially innermost first block 3, it is possible to reduce the difference in wear between the axially innermost first block 3 and the second block 5. If the maximum width B2 in the tire axial direction of the second block 5 is excessively large, there is a possibility that the difference in the rigidity between the axially innermost first block 3 and the second block 5 becomes large, and the wear resistance performance is deteriorated. Therefore, it is preferable that the maximum width B1 of the axially innermost first block 3 is set in a range of from 90% to 98% of the maximum width B2 of the second block 5. Preferably, the maximum width B1 of the axially innermost first block 3 is set in a range of from 5% to 15% of the tread width TW.

The tread of each of the third blocks 6 has a hexagonal shape. The width W3 in the tire axial direction of the third block 6 is gradually decreased from its central portion 6s toward its each end 6t in the tire circumferential direction. In such third block 6, the ends 6t suppress the slippage of the block 6 on the road surface, and the wear resistance performance is improved.

The third block 6 has an inside block edge 6A extending in the tire circumferential direction on its tire equator C side, and an outside block edge 6B extending in the tire circumferential direction on its outside in the tire axial direction.

The axially inside block edge 6A comprises a first oblique part 6a inclined with respect to the tire circumferential direction to one tire axial direction, and a second oblique part 6b inclined with respect to the tire circumferential direction to the other tire axial direction.

The axially outside block edge 6B comprises a third oblique part 6c inclined with respect to the tire circumferential direction to one tire axial direction, and a fourth oblique part 6d inclined with respect to the tire circumferential direction to the other tire axial direction.

The first oblique part 6a of the inside block edge 6A of each of the third blocks 6 overlaps in the tire circumferential direction with the third oblique part 5c of the axially outside block edge 5B of one of the second blocks 5 to form an overlap 13A.

The second oblique part 6b of the inside block edge 6A of each of the third blocks 6 overlaps in the tire circumferential direction with the fourth oblique part 5d of the axially outside block edge 5B one of the second blocks 5 to form an overlap 13B.

It is preferable that the maximum width in the tire axial direction B3 of the third block 6 is more than the maximum width B2 of the second block 5.

The third block 6 is subjected to a larger lateral force than that of the second block 5, therefore, by setting the rigidity in the tire axial direction of the third block 6 as being higher than the rigidity in the tire axial direction of the second block 5, it is possible to reduce the difference in wear between the second block 5 and the third block 6. If the maximum width in the tire axial direction B3 of the third block 6 is excessively large, there is a possibility that the wear resistance performance is deteriorated for the same reason as above. Therefore, the maximum width B2 of the second block 5 is more preferably set in a range of from 75% to 85% of the maximum width B3 of the third block 6.

Figure 3:
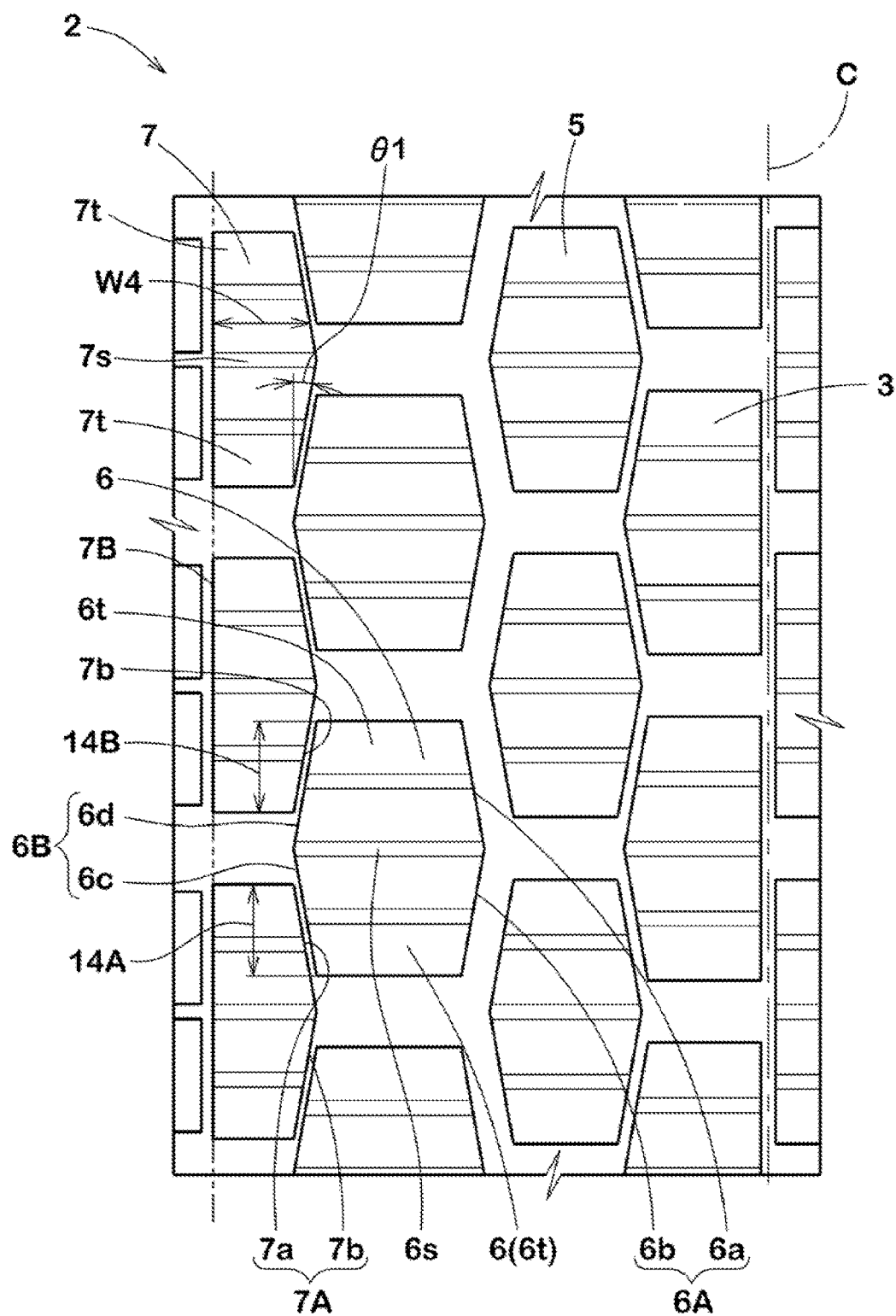

As shown in FIG. 3, the tread of each of the fourth blocks 7 has a pentagonal shape. The width W4 in the tire axial direction of the fourth block 7 is decreased from its central portion 7s toward its each end 7t in the tire circumferential direction. In such fourth block 7, the ends 7t suppress the slippage of the block 7 on the road surface similarly to the axially innermost first block 3, and the wear resistance performance is improved.

As to the shape of the treads of the first blocks 3-the fourth blocks 7, various shapes may be employed aside from the pentagonal shape, hexagonal shape.

The axially outermost fourth block 7 has an inside block edge 7A extending in the tire circumferential direction on its tire equator C side, and an outside block edge 7B extending in the tire circumferential direction on its outside in the tire axial direction.

The axially inside block edge 7A comprises a first oblique part 7a inclined with respect to the tire circumferential direction to one tire axial direction, and a second oblique part 7b inclined with respect to the tire circumferential direction to the other tire axial direction.

The axially outside block edge 7B extends straight in parallel with the tire circumferential direction. Such axially outside block edge 7B does not reduce the rigidity in the tire circumferential direction of an adjacent portion of the fourth block 7 which portion is subjected to the largest lateral force, therefore, the wear resistance performance is improved.

The first oblique part 7a of the inside block edge 7A of each of the fourth blocks 7 overlaps in the tire circumferential direction with the third oblique part 6c of the axially outside block edge 6B of one of the third blocks 6 to form an overlap 14A.

The second oblique part 7b of the inside block edge 7A of each of the fourth blocks 7 overlaps in the tire circumferential direction with the fourth oblique part 6d of the axially outside block edge 6B of one of the third blocks 6 to form an overlap 14B.

If the third blocks 6 and/or fourth blocks 7 are subjected to large force in the tire circumferential direction or axial direction which can largely deform the blocks 6, 7, the blocks 6, 7 can support each other in the overlaps 14A and 14B, therefore, the deformation of the blocks 6, 7 is suppressed, and the wear resistance performance can be improved.

In order to effectively derive the above-mentioned advantageous effects, the axially outside block edge 3B of each of the axially innermost first blocks 3, both of the block edges 5A and 5B of each of the second blocks 5, both of the block edges 6A and 6B of each of the third blocks 6, and the axially inside block edge 7A of each of the fourth blocks 7 each have an inclination angle $\theta 1$ with respect to the tire circumferential direction which is preferably not less than 5 degrees, more preferably not less than 7 degrees, but preferably not more than 15 degrees, more preferably not more than 13 degrees.

Figure 4:
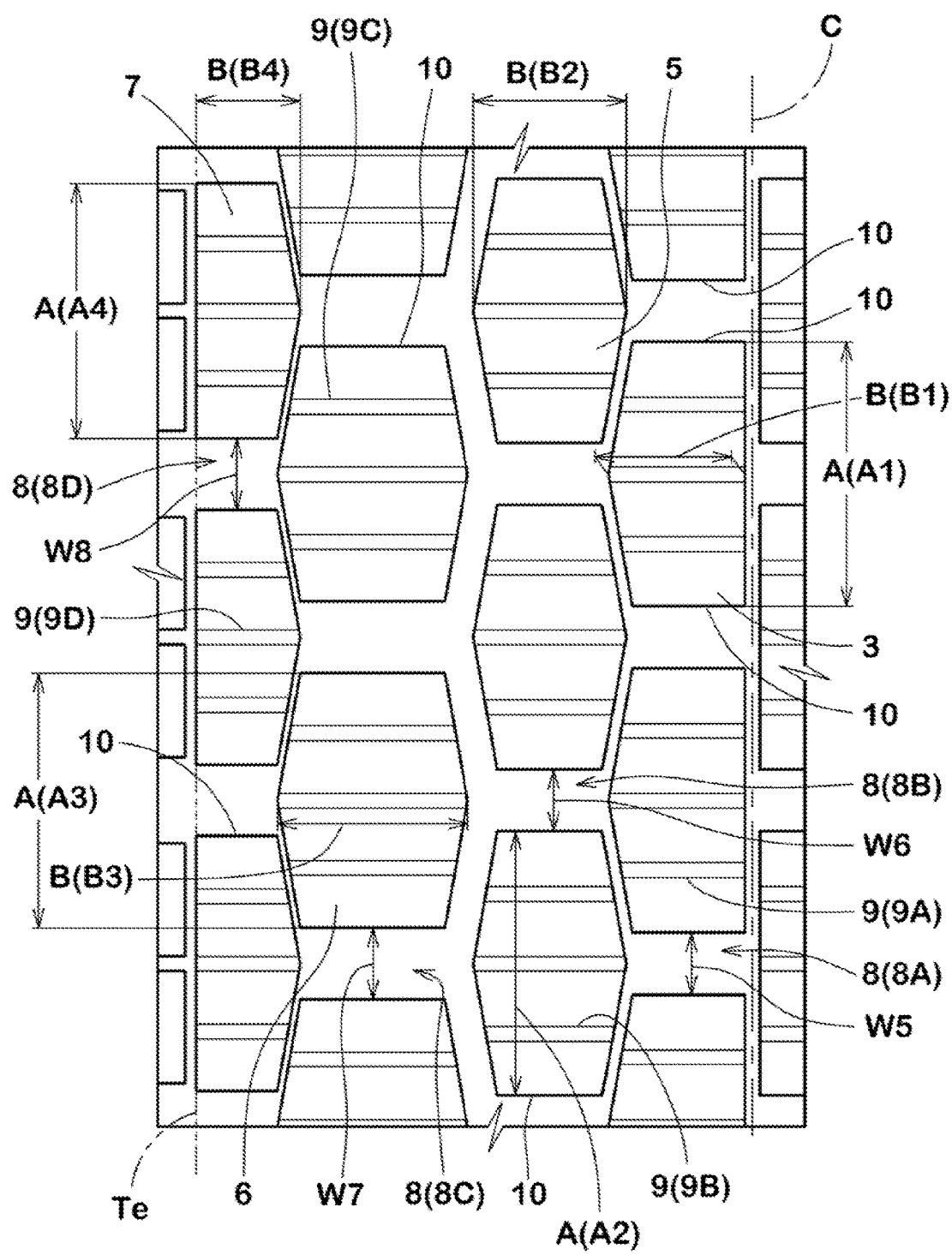

It is not essential but preferable that the maximum width B4 in the tire axial direction of the fourth block 7 (shown in FIG. 4) is set in a range of from 5% to 15% of the tread width TW in order to maintain the rigidity.

The lateral grooves 8A, 8B, 8C and 8D each extend straight in order not to partially reduce the rigidities of adjacent portions of the blocks 3 and 4 to the lateral grooves 8 and not to deteriorate the wear resistance performance.

The lateral grooves 8 are parallel with the tire axial direction in order that edges 10 of the blocks 3 and 4 abutting on the lateral grooves 8 can exert their maximum edge effects to improve the on-icy-road performance.

Aside form such straight and parallel configuration, the lateral grooves 8 may have various configurations such as zigzag configurations and inclined straight configurations.

It is preferable that the groove width W5 of the first lateral groove 8A is set to be less than the groove width W6 of the second lateral groove 8B in order that the maximum length A1 in the tire circumferential direction of the axially innermost first block 3 becomes more than the maximum length A2 in the tire circumferential direction of the second block 5. Therefore, it is possible to increase the rigidity in the tire circumferential direction of the axially innermost first block 3 which is subjected to a higher ground pressure than that of the second block 5 during straight running, and thereby it is possible to decrease the difference in the wear between the axially innermost first blocks 3 and the second blocks 5. In order to effectively derive such function, the groove width W5 of the first lateral groove 8A is preferably set in a range of from 90% to 98% of the groove width W6 of the second lateral groove 8B. The groove width W5 of the first lateral groove 8A is preferably set in a range of from 2% to 9% of the tread width TW in order that ice shaved off by the blocks' edges 10 and sipes' edges is effectively removed from the treads of the blocks into the first lateral grooves 8A.

It is preferable that the groove width W6 of the second lateral groove 8B is set to be less than the groove width W7 of the third lateral groove 8C in order that the maximum length A2 in the tire circumferential direction of the second block 5 becomes more than the maximum length in the tire circumferential direction A3 of the third block 6. Therefore, it is possible to increase the rigidity in the tire circumferential direction of the second block 5 which is subjected to a larger ground pressure than that of the third block 6, and thereby, it is possible to decrease the difference in the wear between the second blocks 5 and the third blocks 6. In order to effectively derive such function, the groove width W6 of the second lateral groove 8B is preferably set in a range of from 80% to 90% of the groove width W7 of the third lateral groove 8C.

It is preferable that the groove width W8 of the fourth lateral groove 8D is set in a range of from 90% to 110% of the groove width W7 of the third lateral groove 8C in order to secure a large maximum length A4 in the tire axial direction of the fourth block 7 to increase the rigidity in the tire circumferential direction of the fourth block 7.

It is not essential but preferable that the groove depth (not shown) of the lateral groove 8 is set in a range of from 8 to 16 mm.

All of the sipes 9A, 9B, 9C and 9D extend straight in order not to partially decrease the rigidity of each block 3, 4 and not to deteriorate the wear resistance performance.

Aside form such straight configuration, the sipes 9A, 9B, 9C and 9D may be provided with zigzag configurations for example.

All of the sipes 9A, 9B, 9C and 9D are parallel with the tire axial direction in order that the sipes 9A, 9B, 9C and 9D can exert their maximum edge effects in the tire rotational direction to improve the on-icy-road performance.

However, the sipes 9A, 9B, 9C and 9D may be inclined with respect to the tire axial direction.

In this embodiment, the sipes 9 disposed in all of the blocks 3 and 4 are the same in the sipe number (six) and the same in the sipe arrangement or circumferential pitches P (large-small-large-small-large-small-large). Therefore, the sipes 9 in each block 3, 4 are described hereunder based on the first sipes 9A disposed in the first block 3 with reference to FIG. 5.

Figure 5:
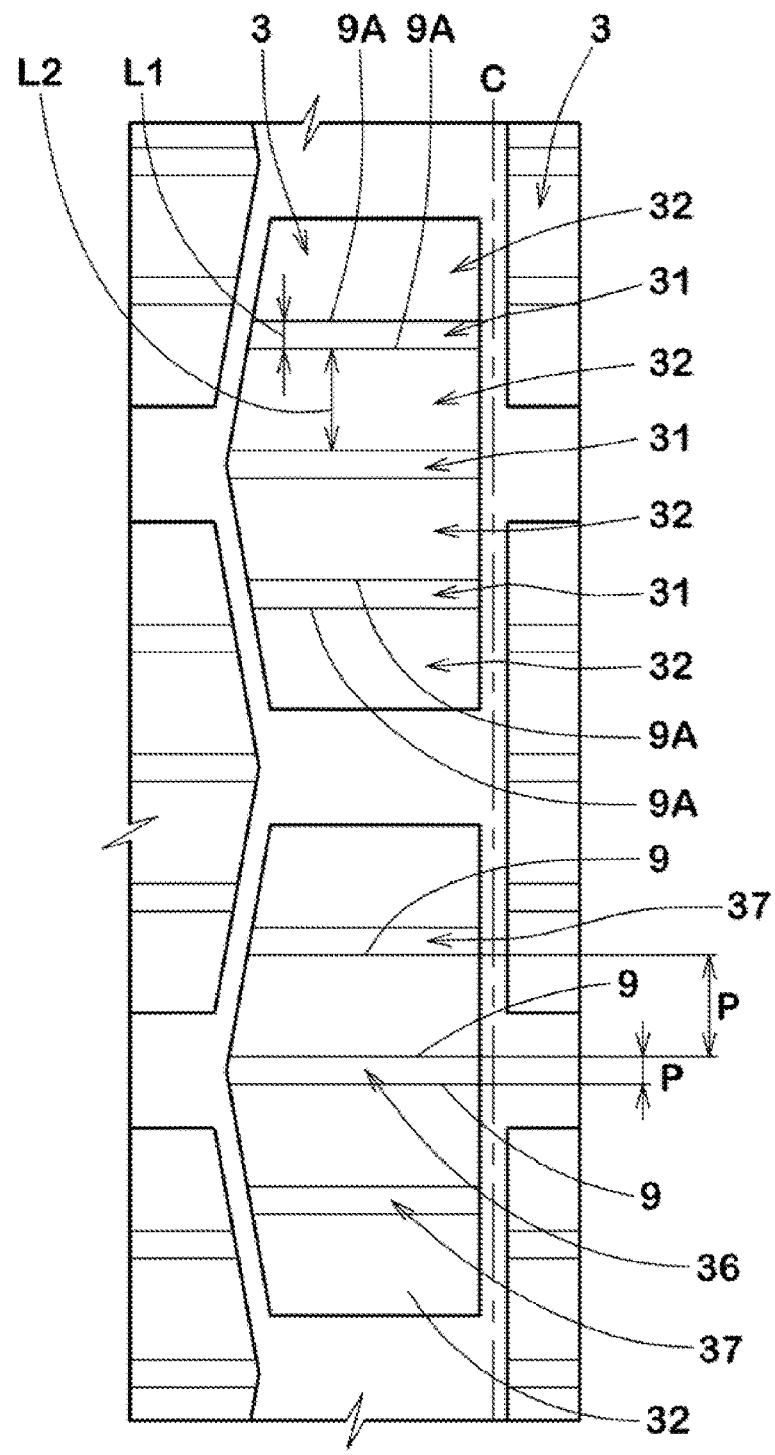

As shown in FIG. 5, in each of the first blocks 3, the pitches P between the sipes 9A are not constant in the tire circumferential direction, and thereby the first block 3 is divided into small block pieces 31 having a smaller width L1 in the tire circumferential direction, and large block pieces 32 having a larger width L2 in the tire circumferential direction than the small block pieces 31.

Since the small block pieces 31 can be deformed relatively easily during running on icy roads, the edges of the small block pieces 31 effectively scratch the icy road surface, and on-icy-road performance is improved. Since the large block pieces 32 are relatively hard to be deformed, the large block pieces 32 contact with the icy road surface to secure a necessary ground contacting area.

The small block pieces 31 and the large block pieces 32 are arranged alternately in the tire circumferential direction in order that the large block pieces 32 prevent the small block pieces 31 from being deformed excessively, and the wear of the block 3 becomes uniform. Thus, the on-icy-road performance and the wear resistance performance can be improved in good balance.

It is preferable that the first block 3 includes three or more small block pieces 31 in order to exert the edge effect effectively.

In this embodiment, the small block pieces 31 are a small block piece 36 having the maximum width B1 in the tire axial direction (shown in FIG. 4) of the first block 3, and a pair of second small block pieces 37 disposed one on each side in the tire circumferential direction of the first small block piece 36, and each of the small block pieces 31 is sandwiched between the large block pieces 32 to prevent an excessive deformation.

The ratio L2/L1 of the width L2 in the tire circumferential direction of the large block piece 32 to the width L1 in the tire circumferential direction of the small block piece 31 is preferably not less than 3.0, more preferably not less than 3.5, but preferably not more than 5.0, more preferably not more than 4.5. Thereby, the on-icy-road performance and the wear resistance can be improved in good balance.

In order to effectively derive the above-mentioned advantageous effects, the width L1 in the tire circumferential direction of the small block piece 31 is preferably 2% to 10% of the maximum length A in the tire circumferential direction (shown in FIG. 4) of the first block 3.

The above description of the first sipes 9A disposed in the first block 3 can be applied to the second sipes 9B disposed in the second block 5 by replacing the first sipe 9A and the first block 3 with the second sipe 9B and the second block 5 respectively, the third sipes 9C disposed in the third block 6 by replacing the first sipe 9A and the first block 3 with the third sipe 9C and the third block 6 respectively, and the fourth sipes 9D disposed in the fourth block 7 by replacing the first sipe 9A and the first block 3 with the fourth sipe 9D and the fourth block 7 respectively.

Next, the depths of the sipes 9A, 9B, 9C and 9D are descried.

It is preferable that the depth of the third sipes 9C (not shown) of the third blocks 6 is more than the depth of the first sipes 9A of the first blocks 3, and more than the depth of the second sipes 9B of the second blocks 5.

During straight running, the third blocks 6 are subjected to smaller pressure than those of the first blocks 3 and the second blocks 5, therefore, by making the depth of the third sipes 9C larger, it is possible to reduce wear difference among the first blocks 3 through the third blocks 6, and thereby their edge effects can be maintained for a long time. For that purpose, the depth of the first sipes and the depth of the second sipes 9B are preferably set in a range of from 70% to 90% of the groove depth of the second lateral grooves 8B. The depth of the third sipes 9C is preferably set in a range of from 87% to 97% of the groove depth of the second lateral grooves 8B.

Further, it is preferable that the depth of the third sipes 9C is more than the depth of the fourth sipes 9D of the fourth blocks 7.

The third blocks 6 are subjected to lateral force smaller than that of the fourth blocks 7, therefore, by making the depth of the third sipes 9C larger, it is possible to reduce wear difference between the third blocks 6 and the fourth blocks 7, and thereby their edge effects can be maintained for a long time.

The summation CE of edge lengths of the sipes 9A and 9B disposed in all of the first blocks 3 and the second blocks 5, is preferably not less than 30000 mm, more preferably not less than 33000 mm, but preferably not more than 40000 mm, more preferably not more than 37000 mm. Thereby, wear of the tread portion 2 in its central region is suppressed, and good on-icy-road performance can be obtained. Incidentally, the edge length of a sipe is the total length of the two edges of the sipe.

The summation SE of edge lengths of the sipes 9C and 9D disposed in all of the third blocks 6 and fourth blocks 7, is preferably not less than 30000 mm, more preferably not less than 33000 mm, but preferably not more than 40000 mm, more preferably not more than 37000 mm. Thereby, uneven wear in lateral regions of the tread portion 2 is suppressed, and good on-icy-road performance can be obtained.

While detailed description has been made of an especially preferable embodiment of the present invention, the present invention can be embodied in various forms without being limited to the illustrated embodiment Comparison Tests Based on the tread pattern shown in FIG. 1, heavy duty pneumatic tires of size 11R22.5 (rim size 8.25×22.5) having specifications listed in Table 1 were experimentally manufactured and tested for the on-icy-road performance and wear resistance performance.

Working examples Exs. 1 to 5 and Comparative examples Refs. 1 to 5: The tires were the same with respect to the design of the blocks with respect to the maximum length in the tire circumferential direction and the maximum width in the tire axial direction of the block, but different from each other with respect to the maximum groove depths of the lateral grooves and the maximum depths of the sipes.

Working examples Exs. 6 to 13: The tires were the same with respect to the maximum lengths in the tire circumferential direction of the blocks, the maximum groove depths of the lateral grooves, and the maximum depths of the sipes, but different from each other with respect to the maximum widths in the tire axial direction of the blocks.

The following were common to all of the test tires: the angles θ1 of the block edges 3B, 5A, 5B, 6A, 6B and 7A: 7 to 13 degrees (constant) the number of sipes in each block: 6

The following comparison tests were carried out by the use of test vehicles (2-D-wheel-type 10 ton truck) provided on all wheels with the same kind of test tires inflated to 900 kPa.

<On-Icy-Road Performance>

During running of the test vehicle on icy road surface of a test course, a test driver evaluated the on-icy-road performance of the tire based on the steering stability, traction, grip and the like. The results are indicated in Table 1 by an index based on Comparative example Ref. 1 being 100, wherein the larger the value, the better the performance.

<Wear Resistance Performance>

After the test vehicle run for 30000 km on dry asphalt roads, the difference in the amount of wear between both ends in the tire circumferential direction of each of the first-third blocks and the difference in the amount of wear between both ends in the tire axial direction of each of the first-third blocks were measured. In each kind of blocks, eight blocks were measured. The obtained 24(=8×3) differences per tire was averaged. The average values in millimeter of the test tires are indicated in Table 1. Thus, the smaller value is better.

TABLE 1

| Tire | Ref. 1 | Ex. 1 | Ref. 2 | Ex. 2 | Ex. 3 | Ex. 4 | Ex. 5 | Ref. 3 | Ref. 4 |
|---|---|---|---|---|---|---|---|---|---|
| G2/G1 (%) | 85 | 102 | 115 | 100 | 110 | 90 | 110 | 110 | 115 |
| G3/G1 (%) | 100 | 95 | 100 | 110 | 110 | 90 | 100 | 100 | 100 |
| G4/G1 (%) | 100 | 94 | 100 | 100 | 110 | 90 | 90 | 85 | 85 |
| B1/B2 (%) | 98 | 98 | 98 | 98 | 98 | 98 | 98 | 98 | 98 |
| B2/B3 (%) | 81 | 81 | 81 | 81 | 81 | 81 | 81 | 81 | 81 |
| on-icy-road performance | 100 | 102 | 100 | 102 | 100 | 100 | 102 | 100 | 98 |
| wear resistance (mm) | 3.7 | 2.0 | 3.8 | 2.5 | 2.8 | 2.8 | 2.6 | 3.8 | 3.9 |

| Tire | Ref. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|
| G2/G1 (%) | 100 | 102 | 102 | 102 | 102 | 102 | 102 | 102 | 102 |
| G3/G1 (%) | 100 | 95 | 95 | 95 | 95 | 95 | 95 | 95 | 95 |
| G4/G1 (%) | 115 | 94 | 94 | 94 | 94 | 94 | 94 | 94 | 94 |
| B1/B2 (%) | 98 | 87 | 90 | 100 | 98 | 98 | 98 | 98 | 98 |
| B2/B3 (%) | 81 | 81 | 81 | 81 | 72 | 75 | 85 | 88 | 100 |
| on-icy-road performance | 100 | 100 | 101 | 100 | 100 | 102 | 102 | 101 | 100 |
| wear resistance (mm) | 3.8 | 2.7 | 2.5 | 2.9 | 2.8 | 2.2 | 2.3 | 2.8 | 2.9 |

It was confirmed through the tests that the tires according to the present invention can be improved in the on-icy-road performance and the wear resistance performance.

REFERENCE SIGNS LIST 1 pneumatic tire
2 tread portion
3 axially innermost first block
4 axially outer block
9 sipe

The invention claimed is:

1. A pneumatic tire comprising a tread portion provided with a plurality of blocks each provided with sipes extending across the entire axial width of the block,
  wherein the blocks include axially innermost first blocks each having a longitudinal block rigidity (G), and axially outer blocks each having a longitudinal block rigidity (G),
  wherein the longitudinal block rigidity (G) of the axially innermost first blocks is 90% to 110% of the longitudinal block rigidity (G) of the axially outer blocks,
  wherein the longitudinal block rigidity (G) of a block is defined by the following equation: $G=(A \times B)/(C \times D \times E)$, wherein
    A is the maximum length in the tire circumferential direction of the block,
    B is the maximum width in the tire axial direction of the block,
    C is the maximum groove depth of lateral grooves which are disposed on both sides of the block in the tire circumferential direction so as to circumferentially divide the block,
    D is the maximum depth of the sipes disposed in the block, and
    E is the number of the sipes disposed in the block,
  wherein the tread portion is provided with a straight groove extending in the tire circumferential direction along the tire equator so as to axially divide the axially innermost first blocks such that the axially innermost first blocks are disposed on both sides of the straight groove, and the axially innermost first blocks each have an axially inner edge abutting on the straight groove,
  wherein the tread portion is further provided with a zigzag groove extending in the tire circumferential direction and disposed on each side of the straight groove such that the axially innermost first blocks each have an axially outer edge abutting on the zigzag groove,
  wherein the axially outer blocks include second blocks disposed on the axially outside of the zigzag groove and each have an axially inner edge abutting on the zigzag groove,
  wherein said axially outer edge of each of the first blocks and said axially inner edge of each of the second blocks are inclined at an angle of not more than 15 degrees with respect to the tire circumferential direction, and
  wherein the maximum width in the tire axial direction of the axially innermost first blocks is less than the maximum width in the tire axial direction of the second blocks.

2. The pneumatic tire according to claim 1, wherein
the lateral grooves include first lateral grooves between the axially innermost first blocks, and second lateral grooves between the second blocks, and
the groove width of the first lateral grooves is less than the groove width of the second lateral grooves.

3. The pneumatic tire according to claim 2, wherein
the axially outer blocks include third blocks disposed axially outside the second blocks adjacently thereto, and
the maximum width in the tire axial direction of the second blocks is less than the maximum width in the tire axial direction of the third blocks.

4. The pneumatic tire according to claim 3, wherein
the lateral grooves include third lateral grooves between the third blocks, and
the groove width of the second lateral grooves is less than the groove width of the third lateral grooves.

5. The pneumatic tire according to claim 4, wherein
the axially outer blocks include fourth blocks disposed between the third blocks and the tread edge, the summation of the edge lengths of the sipes disposed in all of the axially innermost first blocks and second blocks is 30000 to 40000 mm, and the summation of the edge lengths of the sipes disposed in all of the third blocks and fourth blocks is 30000 to 40000 mm.

6. The pneumatic tire according to claim 5, wherein each of the blocks is subdivided in the tire circumferential direction by a plurality of sipes into small block pieces and large block pieces which are alternately arranged in the tire circumferential direction, the small block pieces have a smaller width L1 in the tire circumferential direction, and the large block pieces having a larger width L2 in the tire circumferential direction than the width of the small block pieces.

7. The pneumatic tire according to claim 4, wherein the depth of the sipes of the third blocks is more than the depth of the sipes of the axially innermost first blocks and more than the depth of the sipes of the second blocks.

8. The pneumatic tire according to claim 4, wherein each of the blocks is subdivided in the tire circumferential direction by a plurality of sipes into small block pieces and large block pieces which are alternately arranged in the tire circumferential direction, the small block pieces have a smaller width L1 in the tire circumferential direction, and the large block pieces having a larger width L2 in the tire circumferential direction than the width of the small block pieces.

9. The pneumatic tire according to claim 3, wherein the depth of the sipes of the third blocks is more than the depth of the sipes of the axially innermost first blocks and more than the depth of the sipes of the second blocks.

10. The pneumatic tire according to claim 9, wherein the axially outer blocks include fourth blocks disposed between the third blocks and the tread edge, the summation of the edge lengths of the sipes disposed in all of the axially innermost first blocks and second blocks is 30000 to 40000 mm, and the summation of the edge lengths of the sipes disposed in all of the third blocks and fourth blocks is 30000 to 40000 mm.

11. The pneumatic tire according to claim 10, wherein said depth of the sipes of the third blocks is more than the depth of the sipes of the fourth blocks.

12. The pneumatic tire according to claim 9, wherein each of the blocks is subdivided in the tire circumferential direction by a plurality of sipes into small block pieces and large block pieces which are alternately arranged in the tire circumferential direction, the small block pieces have a smaller width L1 in the tire circumferential direction, and the large block pieces having a larger width L2 in the tire circumferential direction than the width of the small block pieces.

13. The pneumatic tire according to claim 9, wherein the depth of the sipes of the first blocks and the depth of the sipes of the second blocks are in a range of from 70% to 90% of the groove depth of the second lateral grooves, and the depth of the sipes of the third blocks is in a range of from 87% to 97% of the groove depth of the second lateral grooves.

14. The pneumatic tire according to claim 3, wherein each of the blocks is subdivided in the tire circumferential direction by a plurality of sipes into small block pieces and large block pieces which are alternately arranged in the tire circumferential direction, the small block pieces have a smaller width L1 in the tire circumferential direction, and the large block pieces having a larger width L2 in the tire circumferential direction than the width of the small block pieces.

15. The pneumatic tire according to claim 2, wherein each of the blocks is subdivided in the tire circumferential direction by a plurality of sipes into small block pieces and large block pieces which are alternately arranged in the tire circumferential direction, the small block pieces have a smaller width L1 in the tire circumferential direction, and the large block pieces having a larger width L2 in the tire circumferential direction than the width of the small block pieces.

16. The pneumatic tire according to claim 1, wherein each of the blocks is subdivided in the tire circumferential direction by a plurality of sipes into small block pieces and large block pieces which are alternately arranged in the tire circumferential direction, the small block pieces have a smaller width L1 in the tire circumferential direction, and the large block pieces having a larger width L2 in the tire circumferential direction than the width of the small block pieces.

17. The pneumatic tire according to claim 16, wherein the ratio L2/L1 of the width L2 in the tire circumferential direction of the large block pieces to the width L1 in the tire circumferential direction of the small block pieces is 3.0 to 5.0.

18. The pneumatic tire according to claim 17, wherein each of the blocks includes 3 or more small block pieces.

19. The pneumatic tire according to claim 16, wherein each of the blocks includes 3 or more small block pieces.

20. The pneumatic tire according to claim 16, wherein said small block pieces are a first small block piece having the maximum axial width of the block, and a pair of second small block pieces, each one of said pair being disposed on each side in the tire circumferential direction of the first small block piece.

* * * * *